(12) United States Patent
Hao et al.

(10) Patent No.: US 9,906,904 B2
(45) Date of Patent: *Feb. 27, 2018

(54) METHOD, SYSTEM, AND COMPUTER PROGRAM PRODUCT FOR PROVIDING LOCATION BASED SERVICES

(71) Applicant: Amazon Technologies, Inc., Seattle, WA (US)

(72) Inventors: Jianxiu Hao, Lexington, MA (US); Zhiying Jin, Lexington, MA (US); Fenglin Yin, Lexington, MA (US); Guillermo Ortiz, Belmont, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/967,139

(22) Filed: Dec. 11, 2015

(65) Prior Publication Data

US 2016/0127865 A1 May 5, 2016

Related U.S. Application Data

(63) Continuation of application No. 13/456,892, filed on Apr. 26, 2012, now Pat. No. 9,215,565, which is a
(Continued)

(51) Int. Cl.
  *H04W 24/00* (2009.01)
  *H04W 4/02* (2018.01)
  (Continued)

(52) U.S. Cl.
  CPC ............ *H04W 4/021* (2013.01); *G01C 21/34* (2013.01); *G01C 21/3667* (2013.01);
  (Continued)

(58) Field of Classification Search
  CPC ........................................................ H04W 8/18
  See application file for complete search history.

(56) References Cited

U.S. PATENT DOCUMENTS 6,504,503 B1 1/2003 Saint-Hilaire et al.
2001/0048364 A1 12/2001 Kalthoff et al.
(Continued)

FOREIGN PATENT DOCUMENTS

WO WO2004059996 7/2004

OTHER PUBLICATIONS

Office Action for U.S. Appl. No. 13/456,892, dated Oct. 24, 2014, Hao, et al., "Method, System, and Computer Program Product for Providing Location Based Services", 30 pages.
(Continued)

*Primary Examiner* — Charles Shedrick
(74) *Attorney, Agent, or Firm* — Lee & Hayes, PLLC

(57) ABSTRACT

Methods, systems, and computer program products for providing location based services are provided. Embodiments may include storing locations for a plurality of users of a telecommunication environment and contact lists of associated users for the plurality of users. Embodiments may also include providing the locations of the associated users for a first user based on a request from the first user. The request may further include providing locations for associated users who are located within an area of interest. The area of interest may be defined by a particular distance from the first user or by a point of interest of the first user. The locations of the users may be determined based on the locations of communication devices of the users including an identified receiving communication device for each user.

20 Claims, 5 Drawing Sheets

Related U.S. Application Data continuation of application No. 11/615,568, filed on Dec. 22, 2006, now Pat. No. 8,190,174.

(51) Int. Cl.

| | | |
|---|---|---|
| *H04W 4/04* | (2009.01) | |
| *H04L 29/08* | (2006.01) | |
| *G01C 21/34* | (2006.01) | |
| *G01C 21/36* | (2006.01) | |
| *H04W 8/18* | (2009.01) | |

(52) U.S. Cl.
CPC .............. *H04L 67/18* (2013.01); *H04W 4/02* (2013.01); *H04W 4/04* (2013.01); *H04W 8/18* (2013.01)

(56) References Cited

U.S. PATENT DOCUMENTS

| | | | |
|---|---|---|---|
| 2004/0202304 A1 | 10/2004 | Weaver | |
| 2004/0229601 A1* | 11/2004 | Zabawskyj | H04W 76/025 455/417 |
| 2004/0249846 A1* | 12/2004 | Randall | H04M 1/576 |
| 2005/0021773 A1* | 1/2005 | Shiga | G06Q 30/02 709/228 |
| 2005/0157689 A1* | 7/2005 | Schnurr | H04L 12/5815 370/338 |
| 2006/0030334 A1 | 2/2006 | Hashimoto | |
| 2007/0213034 A1 | 9/2007 | Cai et al. | |

OTHER PUBLICATIONS

Office Action dated Oct. 26, 2012 in U.S. Appl. No. 13/456,892, Hao, et al., "Method, System, and Computer Program Product for Providing Location Based Services", 28 pages.

Office Action dated Apr. 5, 2010 in U.S. Appl. No. 11/615,568, Hao et al., "Verizon Method, System, and Computer Program Product for Providing Location Based Services", 10 pages.

Office Action for U.S. Appl. No. 13/456,892, dated May 21, 2015, Hao et al., "Method, System, and Computer Program Product for Providing Location Based Services", 27 pages.

Office Action dated May 23, 2013 in U.S. Appl. No. 13/456,892, Hao et al., "Method, System, and Computer Program Product for Providing Location Based Services", 26 pages.

Final Office Action for U.S. Appl. No. 13/456,892, dated May 7, 2014, Hao, et al., "Method, System, and Computer Program Product for Providing Location Based Services", 25 pages.

Office Action dated Aug. 15, 2013 in U.S. Appl. No. 13/456,892, Hao et al., "Method, System, and Computer Program Product for Providing Location Based Services", 26 pages.

Office Action dated Sep. 20, 2010 in U.S. Appl. No. 11/615,568, Hao et al., "Verizon Method, System, and Computer Program Product for Providing Location Based Services", 15 pages.

\* cited by examiner

METHOD, SYSTEM, AND COMPUTER PROGRAM PRODUCT FOR PROVIDING LOCATION BASED SERVICES

CROSS-REFERENCE TO RELATED APPLICATIONS

This application is a continuation of U.S. patent application Ser. No. 13/456,892, filed on Apr. 26, 2012, which claims the benefit of U.S. patent application Ser. No. 11/615,568, filed Dec. 22, 2006, now U.S. Pat. No. 8,190,174 each of which is incorporated by reference herein in its entirety.

BACKGROUND OF THE INVENTION

People are becoming more and more interconnected through multiple communication devices and networks. For example, a person or user may have a cell phone, home phone, work phone, personal computer, work computer and other communication devices. The multiple communication devices may make it difficult to effectively manage all the messages or calls going to the multiple communication devices. Also, when someone is trying to contact another person, it may be difficult to determine what multiple communication device of the person should be used.

Moreover, as the communication networks become more interconnected and the number of users increases, the operators and providers of the communication networks face ever increasing amount of information and signals to track and process, which adds to complexity and may lead to longer processing times.

BRIEF DESCRIPTION OF THE SEVERAL VIEWS OF THE DRAWING(S)

DETAILED DESCRIPTION

Figure 1:
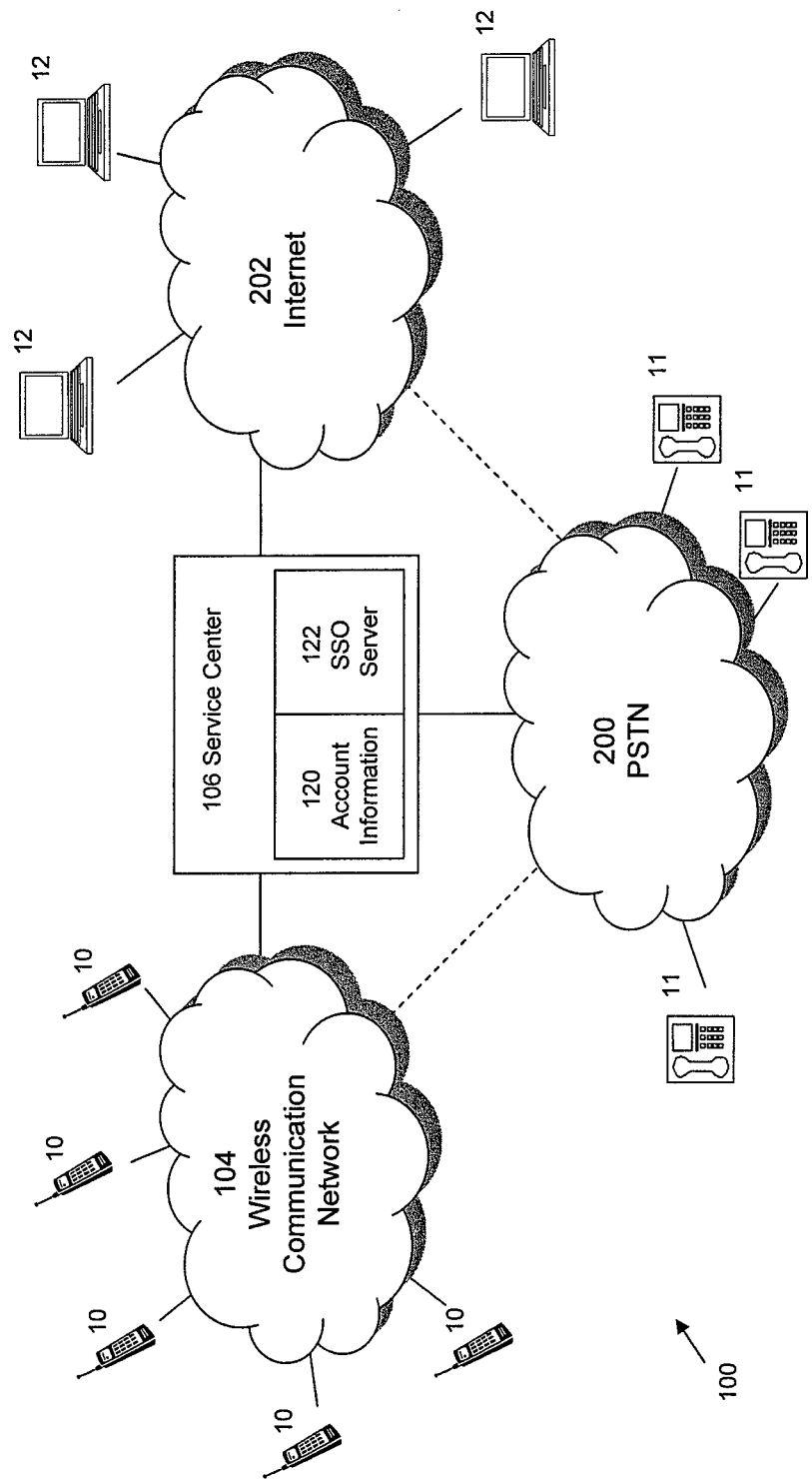
FIG. 1 is a simplified block diagram of a telecommunication environment consistent with exemplary embodiments.

Exemplary embodiments are described hereinafter with reference to the accompanying drawings, in which exemplary embodiments and examples are shown. Like numbers refer to like elements throughout.

Embodiments relate to providing location based services to one or more users of communication devices. Each communication device is configured to operate within a telecommunication environment 100, such as the one illustrated in FIG. 1, in which the communications devices may be selectively and communicatively coupled to one another for receiving and transmitting information. The information may be in a variety of forms including voice signals, text messages, data files, and programming instructions. The communication devices may be communicatively coupled to each other through one or more communication networks. For example, the communication devices may include one or more mobile devices 10, such as cellular phones, personal digital assistants ("PDA"), pagers, or any other wireless personal communication system ("PCS") operable within a wireless communication network 104. The wireless communication network may be based on a variety of technologies and platforms including SS-7 based networks, cellular or third-generation cellular network, or as a more specific example Verizon's Wireless Network. As another example the communication devices may include one or more computing devices 12, such as desktops and laptops, that are within or directly connected to a data network 202, such as a Wide Area Network ("WAN"), Local Area Network ("LAN"), an intranet and/or the Internet, and having various communication programming applications including email, Internet browser, instant or text messaging, or voice over IP (VOIP) applications. In yet another example, the communication devices may include one or more telephone devices 11 connected to the Public Switched Telephone Network ("PSTN") 200 or a private branch exchange ("PBX"). Moreover, a communication device may be part of a hybrid apparatus (not illustrated) that is configured to work within more than one type of communication networks. For example, the communication device may be telephone device configured to work both within a wireless network and landline or wired network.

As illustrated in FIG. 1, the telecommunications environment 100 may also include at least one service center 106. The service center 106 may provide a platform for managing information or communications between the differing networks 104, 200, 202 and between communications devices 10, 11, 12 within the same network or differing networks. The service center 106 may also provide gateway functions, such as code and protocol conversions, to transfer information or communications between the networks 104, 200, 202. The service center 106 may be implemented using a combination of hardware, software, and/or firmware. For example, the service center 106 may be implemented using a plurality of general purpose computers or servers. Although the service center 106 is shown with direct connections to the networks 104, 200, 202 any number and type of network elements may be interposed between the service center 106 and any one or all of the networks. Moreover, it is understood that the service center 106 may be connected to different, additional, or less communication networks than what is illustrated in FIG. 1.

The service center 106 may also provide account management functions for the plurality of users of the communication devices 10, 11, 12 operating within the telecommunications environment 100. For example, the service center 106 may include at least a first computing device, referred to herein as an account information server 120. The account information server 120 may store accounts for one or more of the users of the communication devices 10, 11, 12. The account information server 120 may include or otherwise be in communication with at least one storage element for storing the information and a processing element for processing the information, including in response to a request or instructions received from users. In general, an account includes information and/or instructions pertaining to a particular user. The service center may further include a second computing device, referred to herein as a single sign-on server or SSO server 122. The SSO server may be configured to authenticate and approve access to information stored within the account information server 120 or other information stored in additional servers of the service center 106. In particular, the user may access his account on the account information server 120 by logging on through the SSO server 122 by using one of the communication devices 10, 11, 12. For example, the user may be able to log on through a web page on a computing device 12.

Again as an example, a user may use more than one communication device 10, 11, 12 and may prefer a particular communication device depending on the circumstances. The user may have a cell phone 10, a home phone 11, a work phone (not illustrated), and a computer 12 at work. The user may want to have calls to his home phone 11 forwarded to his cell phone 10 when he is away from his house and/or to have his calls to his cell phone 10 forwarded to his home phone 11 when he is at home. The communication device to which the user wants his calls forwarded is referred to as "the receiving communication device." For this example, when the user is away from home, the cell phone is the receiving communication device and the home phone is a forwarding communication device; and when the user is home, the home phone is the receiving communication device and the cell phone is a forwarding communication device. These forwarding instructions may be stored as part of the user's account at the account information server 120. The forwarding instructions may include a default receiving communication device in absence to specific instructions stating otherwise. The user may establish forwarding instructions to include times or circumstances to forward calls or may access his account through the SSO server 122 to change the forwarding instructions at the time he wants the forwarding instructions to change.

Other information stored within or otherwise accessible by the account information server 120 may be one or more address books or contact lists for the user. A contact list stored within the account information server may be copy of a contact list stored within and/or created at one of the communication devices. A contact list is a list of one or more other users that the first user has an association with. Therefore the users listed in a contact list may be considered "associated users" of the first user. The contact list may be created by the first user through one of the communication devices. The contact list may also be created at least partially by the account information server 120 or other devices of the service center 106. For example, a processor element of the account information server 120 may create a contact list that includes the other users identified through call histories of the communication devices 10, 11, 12 of the first user that are stored within the account information server 120 or the processor element may create the contact list in response to a request to create a contact list based on one or more common attributes of the various users' accounts stored at the account information server 120. A user may have more than one contact list stored at the account server user 120. For example, a first user may have a first contact list of his friends, a second contact list of business associates, a third contact list created by a call history of each of the first user's communication devices and so on.

As yet another example of information forming part of an account and as mentioned above, an account information server 120 may store call histories or caller logs regarding each of the communication devices 10, 11, 12 of the user such that the user may review a history of incoming, outgoing, and missed calls to one of the his communication devices 10, 11, 12.

The account information server 120 may also receive and store a location for each of the plurality of users. More specifically, the account information server 120 may receive and store a location for one or more of the communication devices 10, 11, 12 of the users. For example, the account information server 120 may store a location for each communication device that has a substantially permanent or fixed location, such as a home phone. As a more specific example, the account information server 120 may store a street address for a home phone. In some embodiments, the user may provide or update the street address for one or more of the communication devices. In other communication devices, especially mobile devices, such as cell phones and PDAs, the location of the communication device may change on a regular basis. The account information server 120 may receive updates regarding the location of a communication device from the communication device and/or a location server in communication with the communication device. For example, the communication device may be a cellular phone or other mobile device that includes a locating sensor. Although the type of locating sensor may vary, one type of locating sensor may be configured to operate within a global positing satellite ("GPS") network. An example of such a locating sensor and GPS network is the gpsOne® sensor which is based upon Assisted-Global Positioning System technology ("AGPS"), and on cell network-based trilateration, which may utilize a technology referred to as advanced forward link trilateration ("APLT"). The cellular phone of this example may be further configured to send location updates to the service center 106. The updates may be based on a time interval or event based such as receiving a request for a location update from the service center 106.

As stated above, a user may have more than one communication device 10, 11, 12 and thus the account information server 120 may store more than one location for the multiple communication devices 10, 11, 12 of a particular user. In order to provide a location for the user, the account information server 120 may determine the location of the user to be the same location as the communication device 10, 11, 12 that is considered the receiving communication device according to the call forwarding instructions. Therefore, in the example above, when the user is home the location of the user is consider the same location as the home phone and when the user is away from home the location is considered the location of the cell phone. As stated above, the user may have a default receiving communication device, which may also provide for a default location for the user.

Figure 2:
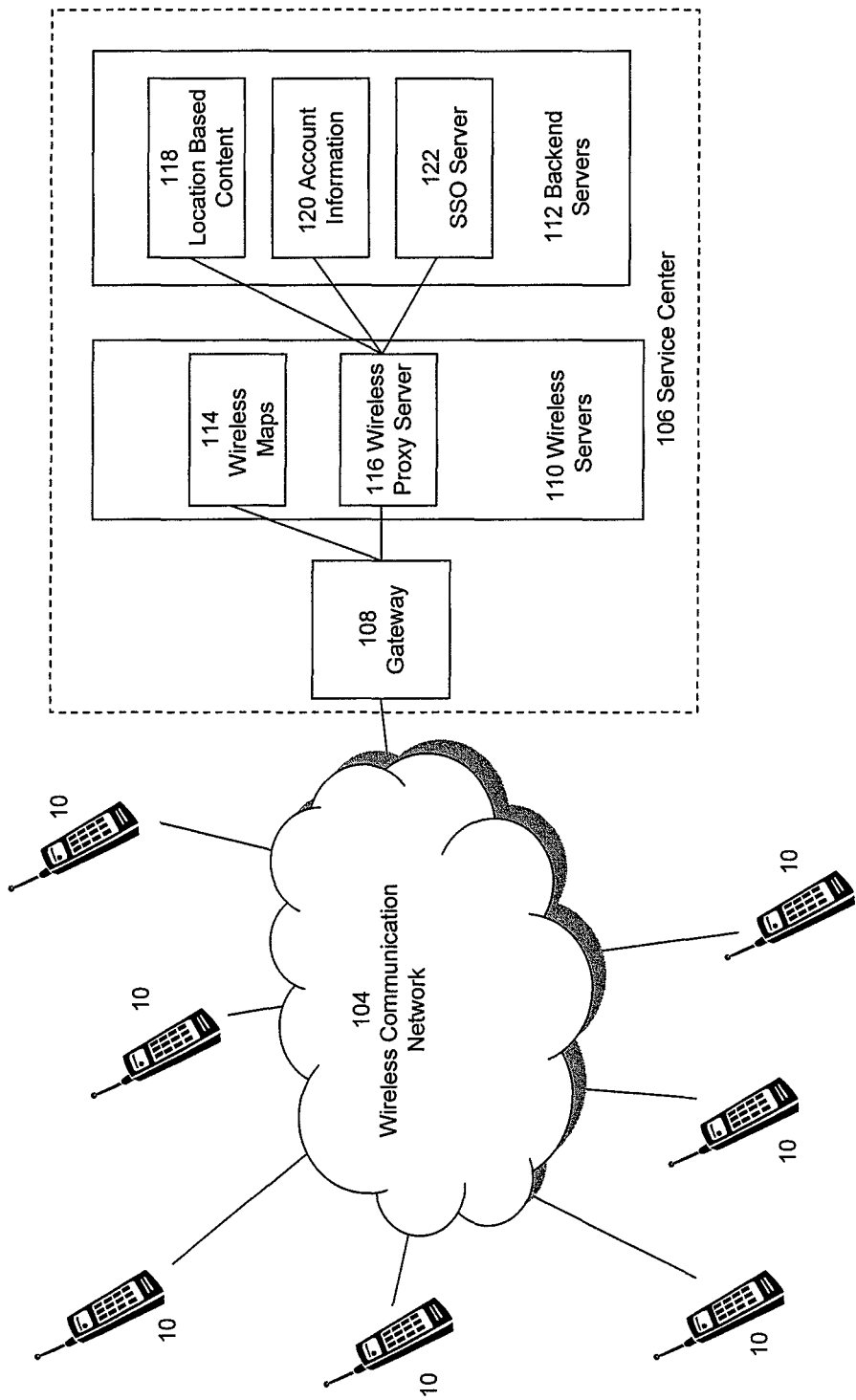
FIG. 2 is another simplified block diagram of at least a portion of a telecommunication environment consistent with exemplary embodiments.

FIG. 2 illustrates an exemplary embodiment of a service center 106 and a plurality of communication devices 10 of a wireless communication network 104. The service center 106 may include a gateway 108, one or more wireless servers 110, and one or more backend servers 112.

The gateway 108 may provide protocol translating functions and may be configured to receive and send instructions and signals for a variety of protocols and platforms. For example, the gateway 108 may be configured to interface between the other devices and elements of the service center and the communication devices operating with various application platforms or protocols including binary runtime environment for wireless ("Brew") protocol, wireless application protocol ("WAP"), and java platform, micro edition ("JavaME" or "J2ME") protocol. Although FIG. 2 illustrates one gateway 108, the service center 106 may include more than one gateway for different types of communication devices.

The wireless servers 110 may include a proxy server 116 and a map server 114. The proxy server 116 may provide cached information from the account information server 120 and/or the proxy server 116 may modify communications and requests between the account information server 120 and the communication devices 10. The map server 114 may include or otherwise be in communication with at least one storage element for maintaining mapping data such as street maps of cities and/or the interstate roadway system and a processing element for developing and sending maps to one or more communication devices based on requests from one or more communication devices 10 or other elements or devices of the service center 106. The processing element may be configured to develop and/or provide the maps in a particular format for the intended communication device.

The backend servers 112 may include the account information server 120, the SSO server 122, and a location based content server 118. The location based content server 118 may include at least a storage element and a processing element for storing and processing the information within the location based content server 118. The location based content server 118 may store information regarding addresses and/or phone numbers to businesses, residences, and other establishments or points of interest. For example, the location based server 118 may contain information found in yellow and white pages or other phone directories.

According to embodiments, the service center 106 may provide location based services to one or more users within the telecommunication environment 100. In general, a location based service includes any service that sends or provides information to a communication device regarding or depending upon the location of the user or other users, communication devices, or points of interest. Location based service may also include sending information regarding the relative locations or directions between any two of users, communication devices, and points of interest.

Figure 3:
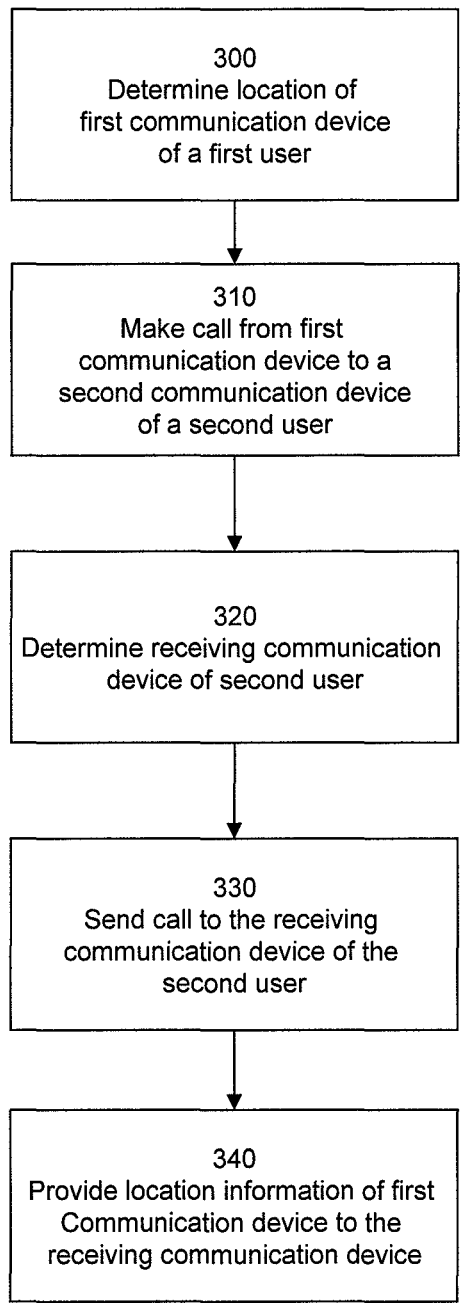
FIG. 3 is a flow chart illustration of a method according to an exemplary embodiment.

FIG. 3 illustrates an example of a method for providing a location based service. For example, a first user of a first communication device makes a phone call to a second communication device of a second user 310. Before or while the call is being connected, the first communication device determines its location 300 and sends the location of the first communication device to the account information server. Depending on the call forwarding instructions 320, the phone call is forwarded to the receiving communication device 330 of the second user. In this example, a third communication device of the second user is the receiving communication device as a result of the call forwarding instructions provided by the second user and thus the third communication device receives the call even though the first user made the call to the second communication device. When the second user receives the call, the second user may receive the location of the first user based on the location of the first communication device 340. Moreover, the second user may request and receive from the service center driving directions from the location of the second user to the location of the first user or a map of the location of the first user or information regarding points of interest relative to either the location of the first user or of the second user. Although not illustrated, the first user may also be able to receive the location of the second user including maps and driving directions to the second user. Therefore the method may include determining the location of the second user. For example, if the receiving communication device of the second user is a home phone then the location may be stored or otherwise accessible to the account information server. If the receiving communication device of the second user is a cellular phone, a locating sensor of the cellular phone may send the location to the account information server. Also, according to this example, even though the first user called the second communication device of the second user, the location of the second user is determined through the location of the third communication device, i.e. the receiving communication device.

Figure 4:
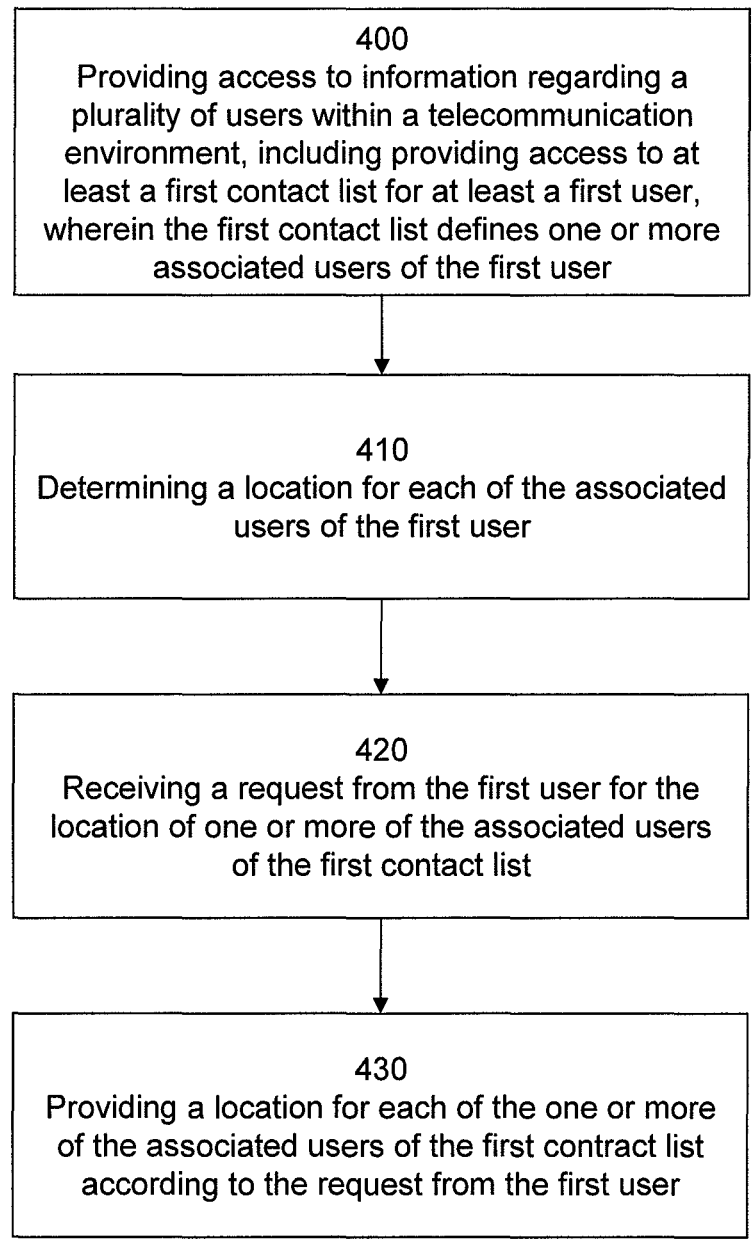
FIG. 4 is a flow chart illustration of a method according to another exemplary embodiment.

FIG. 4 is another example of a method for providing location based service. The method includes providing access to information regarding a plurality of users within a telecommunication environment 400. As described above, the information may include at least a first contact list for at least a first user. Each contact list defines one or more associated users of the first user. The method may also include determining a location for each of the plurality of users 410. The location may be determined through stored locations for communication devices and/or through updated locations sent by the communication devices. In terms of the determination being based on stored locations for communication devices, the location of the user may more particularly be based on the location of the communication device that is identified as the receiving communication device for that user. The method may also include receiving a request from the first user for the location of one or more of the associated users of the first contact list 420. For example, the first user may request the locations through a first communication device such as a cellular phone. And as another example, the first communication device may have a command option through a software application stored within the communication device to locate one or more of the associated users on a contact list. For example, the application of the communication device may provide list of commands on the display of the communication device and one of the commands may be to locate a user or all the users of a contact list. The method may further include providing a location for each of the one or more of the associated users of the first contact list according to the request from the first user 430. For example, the service center may send the locations to the first communication device. The locations may be provided as text, e.g., the addresses may be listed across a display of the first communication device and/or the locations may be overlaid on a map viewable on a display of the first communication device.

As another example, a first user may have a cellular phone and a stored contact list of a second user, a third user, and a fourth user. The first user may request the locations of the second, third, and fourth users through the cellular phone of the first user. The location of each of the second, third, and fourth users may be determined by a stored or received location of the identified receiving communication device for each of the second, third, and fourth users. After determining the locations for each of the second, third, and fourth users, the locations are sent to the cellular phone of the first user.

The request from the first user for a location of the one or more associated users may include a request for the location for only the associated users of the contact list that are within an area of interest and not for the associated users of the contact list outside the area of interest. The area of interest may be defined by in relation to the location of the first user or to a point of interest. For example, the first user may request the location of each of the associated users who are within a 10 miles radius of the first user or within the same city as the first user. Or the first user may request the location of each of the associated users within a particular area relative to a point of interest.

In addition to providing locations of the associated users, the system and method may further provide directions, such as driving directions, to the first user in order to help the first user find one or more of the associated users or conduct other location based searches as further disclosed in U.S. application Ser. No. 11/615,519, entitled "METHODS AND APPARATUS FOR PROVIDING A LOCATION BASED SEARCH", assigned to the assignee of the present application and filed on the same day as the present application, which is hereby incorporated in its entirety.

Furthermore the system and method may also analyze the locations associated with users and generate useful statistical information. For example, by examining the location changes, a user's (or a group of users') traveling speed on a highway or a street can be determined and be used to identify traffic jams. The information can in turn be shared with the entire user community to avoid jams in the driving directions. Yet in another example these statistical traveling speed information can be integrated into the shortest or quickest route computations to provide users with the best real time traveling route.

It is understood that the operations described for the illustrated methods of FIGS. 3 and 4 may be performed through hardware, software, or combination thereof. Therefore embodiments may take the form of hardware systems and/or apparatuses, software, or combinations thereof. As an example, embodiments may include a computer program product stored on a computer-readable storage medium (i.e. software) comprising of one or more executable portions for performing the operations described herein. As another example, one or more of the devices and/or systems of the service center may perform one or more of the operations.

Figure 5:
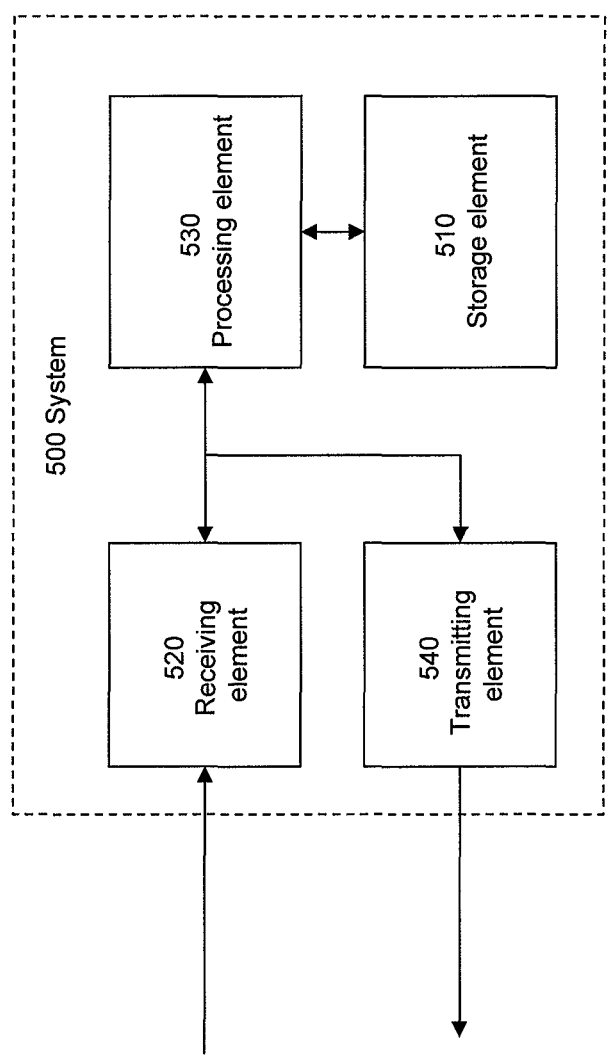
FIG. 5 is a simplified block diagram of a system according to yet another exemplary embodiment.

As a more specific example and as illustrated in FIG. 5, an embodiment may include a system 500 having at least one storage element 510 for maintaining information regarding a plurality of users within a telecommunication environment, including at least a first contact list for at least a first user, wherein the first contact list defines one or more associated users of the first user; a receiving element 520 configured to receive a request from a communication device of the first user for a location of one or more of the associated users of the first user; a processing element 530 for determining the location of the one or more of the associated users of the first user according to the request with the determination being based at least partially upon the information maintained in the storage element; and a transmitting element 540 for sending the location of the one or more associated users to the first user.

The processing element 530 may be embodied in many ways. For example, the processing element 530 may be embodied as a processor, a coprocessor, a controller or various other processing means or devices including integrated circuits such as, for example, an application specific integrated circuit ("ASIC"). The storage element or elements 510 may be various memory devices including volatile and non-volatile memory devices. The at least one storage element may be configured to store information, data, applications, instructions or the like for enabling the system 500 to carry out various functions in accordance with exemplary embodiments. For example, the storage element 510 could be configured to buffer input data for processing by the processing element 530. The receiving element 520 and the transmitting element 540 may be embodied as any device or means embodied in either hardware, software, or a combination of hardware and software that is configured to receive and/or transmit data from/to the processing element 530.

The at least one storage element may also maintain mapping information. The processing element may also determine driving directions to at least one of the associated users from the location of the first users. And the transmitting elements may send the driving directions to the communication device of the first user.

In another embodiment, one or more of the plurality of users may have one or more communication devices and the at least one storage element may maintain instructions from the one or more users defining a receiving communication device out of the one or more communication devices of each of the users. And the location for each of the one or more users may be based on the receiving communication device, such as a fixed location for a wired communication device and a location determined dynamically such as a GPS sensor for a wireless communication device. In this respect, at least one of the receiving communication devices of the plurality of users may be a mobile device having a locating sensor and the receiving element may receive updates from the mobile device regarding the location of the mobile device.

In yet another embodiment, the system may comprise an authentication element for allowing at least partial access for the first user to information maintained in the at least one storage element. The authentication element may be embodied as any device or means embodied in either hardware, software, or a combination of hardware and software that is configured to determine authorization to the information stored within the system. As an example, the authentication element may be a SSO server.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A system comprising:
   a processing element; and
   a storage element coupled to the processing element and storing instructions that cause the system to:
   receive, from a computing device of a first user, a request to identify one or more users who are included in a contact list of the first user and are within an area of interest, the area of interest defined at least in part by a point of interest different from a location of the computing device of the first user and defined without reference to the location of the computing device of the first user;
   determine that the contact list of the first user includes a second user;
   receive information indicating a location of a wireless communication device associated with the second user;
   determine that the location of the wireless communication device associated with the second user is within the area of interest; and
   transmit, to the computing device of the first user: (i) an indication that the second user is within the area of interest, and (ii) the information indicating the location of the wireless communication device associated with the second user.

2. The system of claim 1, wherein the point of interest is selected by the first user.

3. The system of claim 1, wherein request to identify one or more users who are included in a contact list of the first user comprises a request to identify all users who are included in the contact list.

4. The system of claim 1, wherein the information indicating the location of the wireless communication device is received as an update from the wireless communication device or from a location server in communication with the wireless communication device.

5. The system of claim 1, wherein the information indicating the location of the wireless communication device associated with the second user is transmitted to the computing device of the first user as (i) text identifying the location of the wireless communication device associated with the second user by address or (ii) an overlay on a map showing the location of the wireless communication device associated with the second user.

6. The system of claim 1, wherein the instructions cause the system to establish a connection between the computing device of the first user and the wireless communication device associated with the second user without additional user input.

7. The system of claim 1, wherein the storage element comprises mapping information and the instructions cause the system to determine driving directions to the location of the wireless communication device associated with the second user.

8. A method comprising:
   receiving a request to identifying locations of one or more users who are included in a call history of a first user and are within an area of interest;
   determining that the call history of the first user includes a second user;
   receiving an indication of a location of a wireless communication device associated with the second user;
   determining that the location of the wireless communication device is within the area of interest; and
   causing display of (i) an indication that the second user is within the area of interest or (ii) the indication of the location of the wireless communication device associated with the second user.

9. The method of claim 8, wherein the area of interest comprises an area defined relative to a location of a computing device of the first user.

10. The method of claim 8, wherein the area of interest comprises an area defined relative to a point of interest, the point of interest different from a location of a computing device of the first user and defined without reference to the location of the computing device of the first user.

11. The method of claim 8, wherein the second user is associated with a plurality of communication devices and the wireless communication device is identified as a receiving communication device for the second user.

12. The method of claim 8, wherein the indication of the location of the wireless communication device is received from the wireless communication device.

13. The method of claim 8, further comprising determining directions to the location of the wireless communication device.

14. A method implemented on a computing device of a first user, the method comprising:
   receiving a command to locate one or more users in a contact list that are within an area of interest, the command including an indication of the one or more users;
   responsive to receiving the command, receiving identification of a second user as being included in the contact list;
   responsive to receiving identification of the second user, receiving information indicating a location of the second user, the location within the area of interest; and
   displaying the information indicating the location of the second user on a display of the computing device.

15. The method of claim 14, wherein the computing device is a hybrid apparatus that is configured to communicate over the Internet and over a Public Switched Telephone Network.

16. The method of claim 14, wherein the contact list is stored in the memory of the computing device.

17. The method of claim 14, wherein the area of interest comprises an area defined relative to a location determined by a locating sensor in the computing device.

18. The method of claim 14, wherein the displaying comprises displaying the information indicating the location in text form as an address.

19. The method of claim 14, wherein the displaying comprises displaying the information indicating the location as an overlay on a map viewable on the display of the computing device.

20. The method of claim 14, further comprising displaying directions from a location of the computing device to the location of the second user.

* * * * *